(12) United States Patent
Moro et al.

(10) Patent No.: US 6,850,694 B1
(45) Date of Patent: Feb. 1, 2005

(54) VIDEO SIGNAL PROCESSING APPARATUS (75) Inventors: Eiji Moro, Hitachinaka (JP); Ken Sodeyama, Hitachinaka (JP); Hiroyuki Hori, Hitachi (JP); Katsuyuki Watanabe, Mito (JP); Akifumi Tabata, Naka (JP)

(73) Assignee: Hitachi, Ltd., Tokyo (JP)

( * ) Notice: Subject to any disclaimer, the term of this patent is extended or adjusted under 35 U.S.C. 154(b) by 953 days.

(21) Appl. No.: 09/640,645

(22) Filed: Aug. 18, 2000

(30) Foreign Application Priority Data

Jun. 26, 2000 (JP) .......................................... 12-196260

(51) Int. Cl.$^7$ ............................................... H04N 5/95
(52) U.S. Cl. ............................. 386/85; 386/68; 386/70; 386/109; 386/117
(58) Field of Search .............................. 386/85, 68, 70, 386/109, 117; 348/500, 510, 512, 513, 526, 542, 545

(56) References Cited

U.S. PATENT DOCUMENTS 5,671,260 A * 9/1997 Yamauchi et al. .......... 375/372
5,999,226 A * 12/1999 Choi .......................... 348/564

* cited by examiner

*Primary Examiner*—Chris Kelly
*Assistant Examiner*—Alicia M. Duggins
(74) *Attorney, Agent, or Firm*—Antonelli, Terry, Stout & Kraus, LLP (57) ABSTRACT

The present invention relates to a video signal processing apparatus for outputting an inputted video signal after subjecting the video signal to time axis correction, particularly to a video signal processing apparatus preferable in the case of subjecting the video signal to image compression. In the case in which a nonstandard signal is inputted to an image compression circuit of an MPEG2 encoder or the like, a drawback of freezing image or generating block noise or the like is resolved. A time axis correcting circuit stores an input signal to a memory and reads the input signal at a timing delayed from V synchronization of the input signal by a predetermined time period. For that purpose, a read synchronizing signal generator is reset at respective input field. A reset position is set to a position preceding the read V synchronization position by 3H through 10H. It is detected whether the input signal is a non-interlace signal or a field length thereof is deviated from a standard value and in these cases, odd/even order or synchronization timing of a synchronizing signal is corrected. Further, when the input signal is a nonstandard signal, the input signal is outputted without passing through the image compression circuit by a changeover switch.

17 Claims, 6 Drawing Sheets

VIDEO SIGNAL PROCESSING APPARATUS

BACKGROUND OF THE INVENTION

The present invention relates to a video signal processing apparatus for outputting an inputted video signal after subjecting the video signal to time axis correction, particularly to a video signal processing apparatus preferable when the video signal is subjected to image compression.

In a reproduced signal processing of conventional VTR for household use, there is used a time axis correcting circuit or a time base corrector (hereinafter, abbreviated as TBC) for correcting a variation in an input signal with respect to a time axis. TBC corrects a time axis error by executing writing to a memory based on a write control signal having a time axis variation substantially the same as the time axis variation in the input signal and executing reading from the memory based on a read control signal substantially in synchronism with a period of a synchronizing signal of a standard signal. The technology is described, for example, in "Home video technology" p.115 edited by Nihon Hoso Kyokai.

Figure 2:
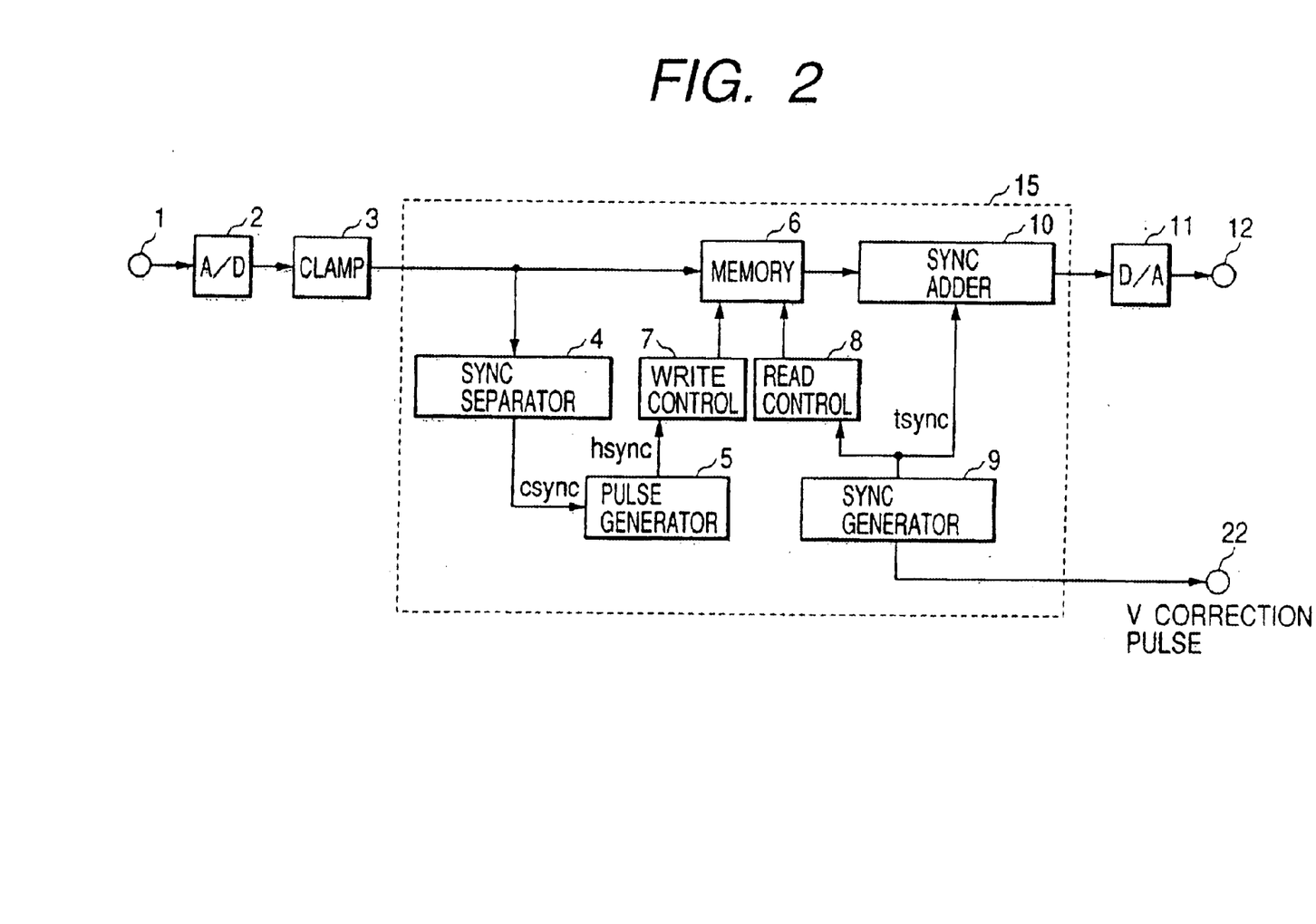
FIG. 2 is a block diagram showing an example of a related art of video signal processing apparatus.

FIG. 2 shows an example of a block diagram of a related TBC. A reproduced video signal inputted from a terminal 1 is subjected to digital conversion by an A/D converter 2 and is inputted to a synchronizing signal separator 4 and a line memory 6. The synchronizing signal separator 4 detects a synchronizing signal of an input signal and generates a composite synchronizing signal pulse csync in synchronism therewith. The pulse csync is inputted to a pulse generator 5 and a horizontal synchronizing signal pulse hsync is generated. The pulse hsync is inputted to a write control circuit 7 and an output from the A/D converter 2 is subjected to a clamp processing by a clamp circuit 3 and is thereafter stored to the memory 6. In the meantime, a synchronizing signal generator 9 generates a standard composite synchronizing signal tsync in synchronism with a standard signal. The signal tsync is inputted to a read control circuit 8 and data stored in the memory is read at a period substantially in synchronism with the standard signal. Thereby, from the memory 6, there is outputted a video signal a time axis variation of which has been corrected.

According to the above-described TBC operation, an amount of a deviation between periods of the input signal including the time axis error and an output signal corrected with the time axis error, is absorbed by the capacity of the memory 6. When an average period of the input signal does not coincide with a period of the standard signal, the deviation amount is gradually accumulated and when the accumulated deviation amount cannot be absorbed, the TBC operation is failed.

There is shown one method for avoiding the problem as follows. The synchronizing signal generator 9 generates a V correction pulse indicating a vertical synchronizing signal portion of the signal tsync and outputs the V correction pulse from a terminal 22. Thereby, a rotating cylinder is controlled. That is, although a servo unit executes a control such that 1 field of a reproduced signal constitutes a half period of the rotating cylinder, the servo unit further executes a control such that a period of rotation of the rotating cylinder is conformed to a period of the V correction pulse, described above. By the control, a field period of the input signal inputted from the terminal 1 substantially coincides with the signal tsync and accordingly, the average period of the input signal coincides with the period of the standard signal and the deviation amount does not accumulate. Such a control of the rotating cylinder by the V correction pulse is referred to as servo feedback.

Further, there is presented a video signal processing apparatus in which a time axis correction circuit is connected to an image compression circuit for generating image compression data in DVD recorder block of FIG. 2 in "Development of a DVD recorder using DVD-RW; Image information media society technical report, Nov. 24, 1999". In the drawing, TBC is provided at a prestage of MPEG1/2 Video Encoder, however, no description has been given of operation of TBC in this case.

BRIEF SUMMARY OF THE INVENTION

Standard of image compression technology of MPEG2 or the like is a standard formed by assuming standard signal input and an image compression circuit of an MPEG2 encoder or the like in compliance with the standard is operated on the premise of the standard signal input. Therefore, when a nonstandard signal is inputted, there poses a problem of causing a drawback of freezing image or generating block noise or the like.

In order to resolve this, there is conceivable a method of suppressing jitter provided to the nonstandard signal by providing the above-described time axis correcting circuit TBC at a prestage of the image compression circuit. However, in the case in which there is a deviation in an average period of the input signal, the method of servo feedback in the above-described conventional TBC system can no more be applied. Because although the servo feedback is effective in the case in which the period of the reproduced signal inputted by controlling the rotating cylinder in reproduction is adjusted, as the period of the input signal in recording operation, explaining by taking an example of TV broadcast, this is a period determined by the facility of the broadcast station and it is impossible to change the period by applying the above-described method of servo feedback with regard thereto.

It is an object of the present invention to resolve the above-described problem of the conventional technology and to provide a video signal processing apparatus having a time axis correcting function for processing an input signal to an image compression circuit in a mode proximate to a standard signal and preferably capable of processing also a case of inputting a non-interlace signal or a nonstandard signal a field length of which differs from standard.

In order to resolve the above-described problem, according to an aspect of the present invention, there is provided a video signal processing apparatus comprising a memory to which an inputted first video signal is written, a compression circuit for subjecting a second video signal read from the memory to data compression, and an expansion circuit for generating a third video signal by subjecting the compressed signal to data expansion, further comprising a synchronizing signal separator for separating first synchronization information from the first video signal, writing and reading control circuits for controlling writing and reading to and from the memory, a changeover switch for selecting and outputting either one of the first and the second video signals or the third video signal, and a switch control circuit for controlling to select the changeover switch based on the first synchronization information.

According to another aspect of the present invention, there is provided the video signal processing apparatus, further comprising a field discriminator for discriminating whether the first video signal is an interlace signal or a noninterlace signal from the first synchronization information, wherein the switch control circuit controls to switch the changeover switch based on a result of discrimination of the field discriminator. According to another aspect of the present invention, there is provided the video signal processing apparatus further comprising a field length detector for detecting a field length from the first synchronization information, wherein the switch control circuit controls to switch the changeover switch based on a value of the field length Tf1.

Further, according to another aspect of the present invention, there is provided a video signal processing apparatus for writing an inputted first video signal to a memory and reading the first video signal from the memory as a second video signal, the video signal processing apparatus comprising a synchronizing signal separator for separating first synchronization information from the first video signal, a write control circuit for controlling writing to the memory based on the first synchronization information, a synchronizing signal generator for generating second synchronization information, and a read control circuit for controlling reading from the memory based on the second synchronization information, wherein the synchronizing signal generator generates the second synchronization information having a front edge of a vertical synchronization waveform at a position delayed from a front edge of a vertical synchronization waveform included in the first synchronization information by a predetermined delay time Td.

For that purpose, according to another aspect of the present invention, there is provided the video signal processing apparatus, further comprising a reset circuit for generating a reset pulse to the second synchronization information generator at respective one field while being delayed from the vertical synchronization timing information included in the first synchronization information by a predetermined delay time Td1. The synchronizing signal generator generates a synchronizing signal including one discontinuity point in a field and generates the second synchronization information including vertical synchronization information at a position delayed from the discontinuity point by 3H through 10H (notation H designates a-horizontal synchronization period).

Further, according to another aspect of the present invention, there is provided the video signal processing apparatus, further comprising a field discriminator for discriminating whether the first video signal is an interlace signal or a non-interlace signal from the first synchronization information, wherein the synchronizing signal generator selects to generate odd synchronization information or even synchronization information as the second synchronization information based on a result of discrimination of the field discriminator. Further, according to another aspect of the present invention, there is provided the video signal processing apparatus, further comprising a field length detector for detecting a field length from the first synchronization information, wherein the synchronizing signal generator generates the second synchronization information by correcting the delay time Td1 based on a value of the field length Tf1.

BRIEF DESCRIPTION OF THE SEVERAL VIEWS OF THE DRAWING

These and other objects, features and advantages of the present invention will become more readily apparent from the following detailed description when taken in conjunction with the accompanying drawing wherein.

DETAILED DESCRIPTION OF THE INVENTION

Figure 1:
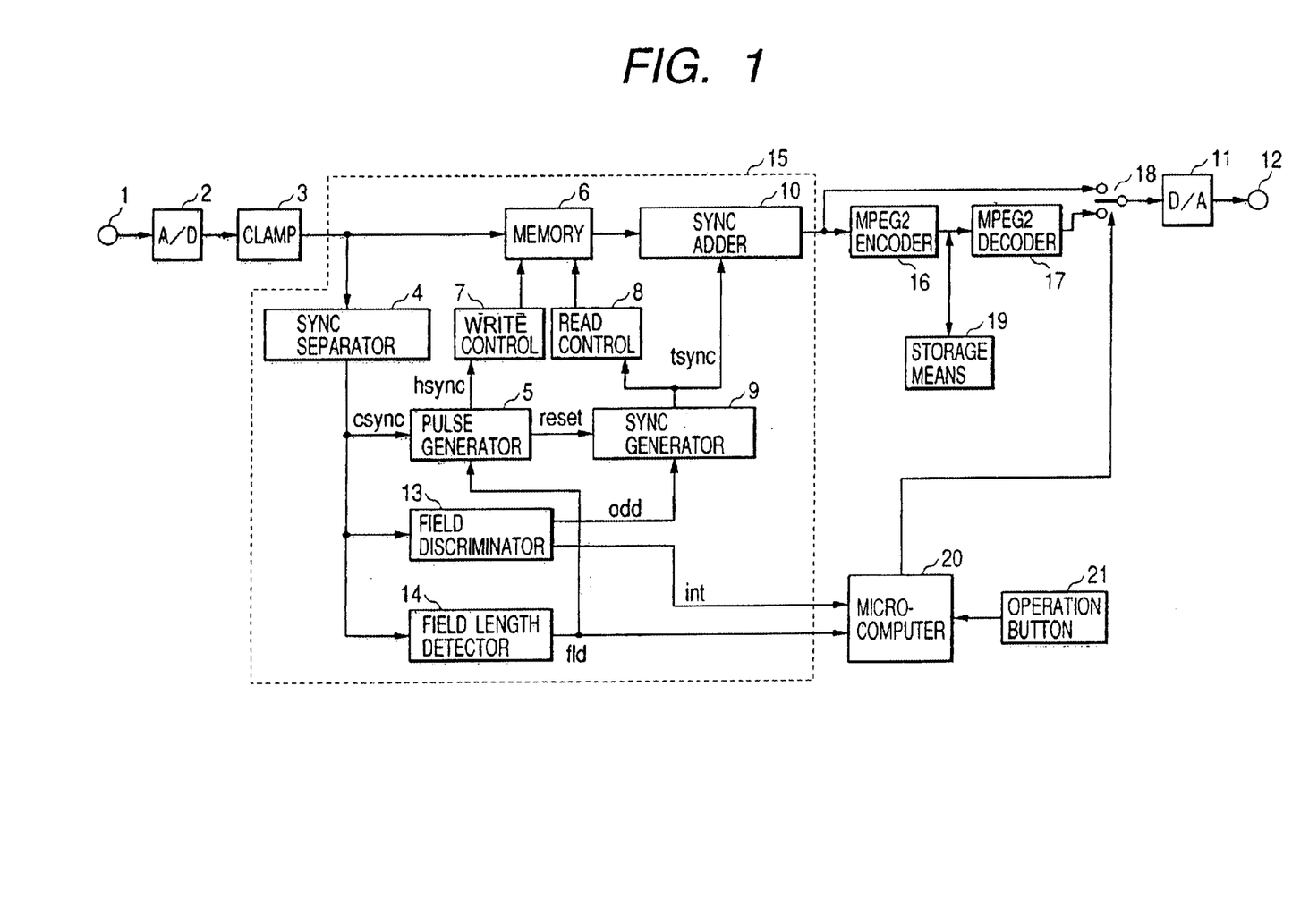
FIG. 1 is a block diagram showing an embodiment of a video signal processing apparatus according to the present invention.

An explanation will be given of an embodiment of a video signal processing apparatus according to the present invention as follows. FIG. 1 shows a block diagram of a video signal processing apparatus according to the present invention. A video signal inputted from the terminal 1 is subjected to digital conversion by the A/D converter 2, subjected to the clamp processing by the clamp circuit 3 and is inputted to the synchronizing signal separator 4 and the memory 6. At the synchronizing signal separator 4, a synchronizing signal of the input signal is detected and there is generated a composite synchronizing signal pulse (hereinafter, referred to as csync) substantially in synchronism with the synchronizing signal of the input signal. The pulse csync is inputted to the pulse generator 5, equalizing pulses are removed and a horizontal synchronizing signal pulse (hereinafter, referred to as hsync) is generated. The pulse hsync is inputted to the write control circuit 7 and based thereon, there is generated a write address indicating a position of storing data to the line memory. Further, the write address is reset with the pulse hsync as a trigger.

In the synchronizing signal generator 9, by counting a predetermined value by a counter, there is generated a standard composite synchronizing signal (hereinafter, referred to as tsync). The pulse tsync is inputted to the read control circuit 8 and there is generated a read address for reading data stored to the memory based on the pulse tsync at intervals substantially in synchronism with a standard signal. In writing to the memory 6, write control is carried out with the pulse hsync having a time axis variation as a trigger and read control is carried out with the pulse tsync not including time axis variation as a trigger and therefore, a video signal outputted from the memory 6 is outputted in a state in which the time axis variation has been corrected. In a synchronizing signal adder 10, the pulse tsync generated by the synchronizing signal generator 9 is added to a signal read from the memory 6 and the added signal is subjected to analog conversion by a D/A converter 11 and is outputted from the terminal 12. A portion surrounded by a broken line 15 indicates a TBC block.

According to the present invention, in the TBC block 15, there are added a field discriminator 13 and a field length detector 14. Further, a reset pulse of reset generated from the pulse generator 5 is inputted to the synchronizing signal generator 9.

A signal which has been processed by the TBC block 15 is transmitted to an MPEG2 encoder 16 and an MPEG2 decoder 17 and is recorded and reproduced by a storage means 19.

An explanation will be given of the operation as follows. In the pulse generator 5, a vertical synchronizing timing of the pulse csync is detected and based on the detected vertical timing information, once per field, at a specific timing, the reset pulse of reset is generated. In the synchronizing signal generator 9, the phase of the pulse tsync is reset at the reset timing. By this operation, a phase relationship between the pulse csync and the pulse tsync (timings of vertical synchronizing signals of both) ,is reset to a phase relationship having a predetermined delay time Td once per field, that is, a phase difference accumulated between the input and the output signals of the memory 6 is resolved once per field.

The phase difference is absorbed in a form of making the phase on the side of the pulse tsync follow the phase on the side of the input signal and therefore, even in the case in which numbers of lines per field of the input signals differ, periods of field coincide with each other. However, at instance at which the phase of the pulse tsync is reset, there is produced a discontinuity point in a waveform of the synchronizing signal outputted from the synchronizing signal generator 9 and therefore, there poses a problem in which a discontinuity of image (hereinafter, abbreviated as skew) is caused.

Figure 4:
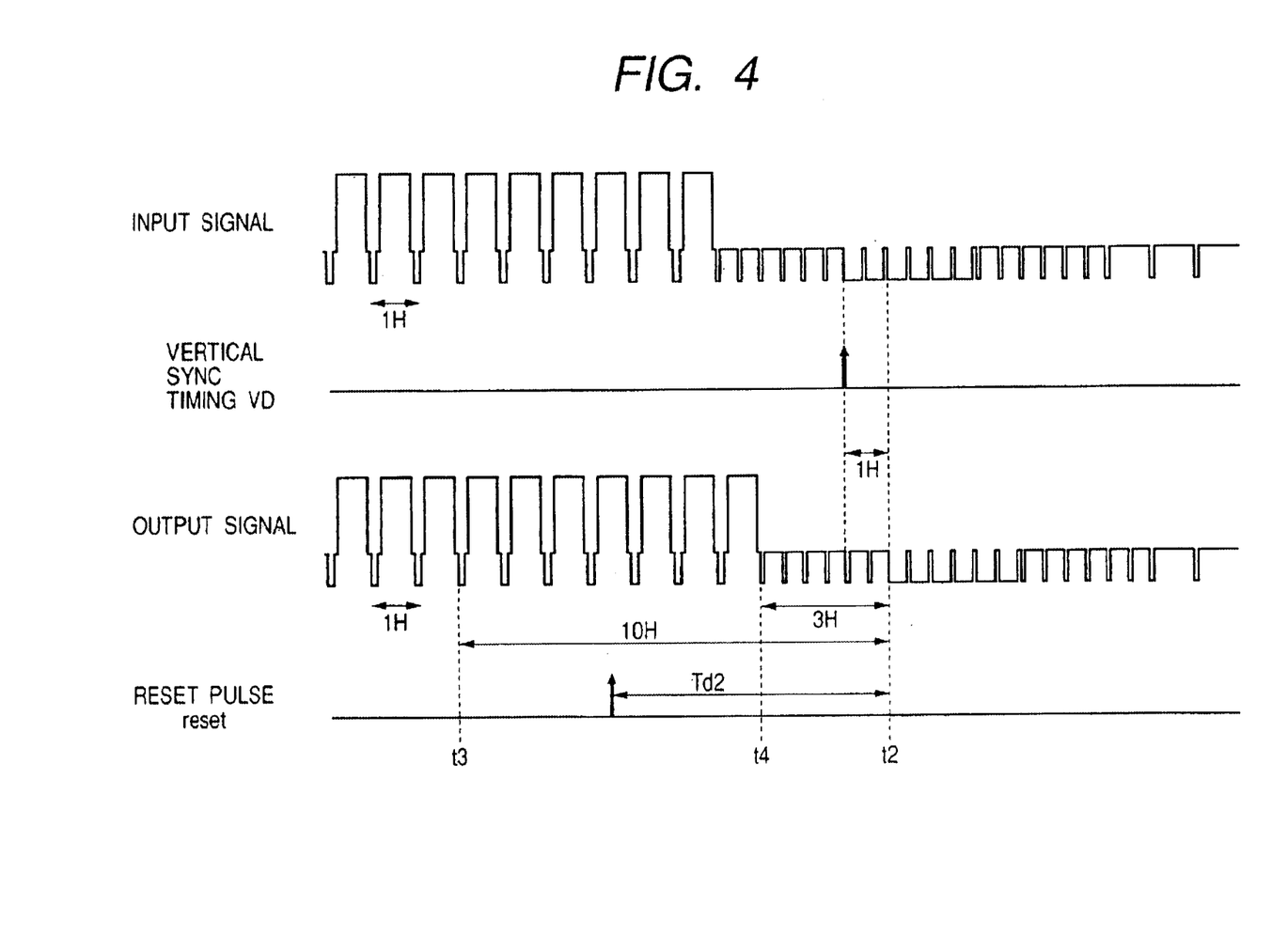
FIG. 4 is a diagram showing an example of a timing of generating a reset pulse in FIG. 1.

Next, an explanation will be given of a timing of setting the phase of the pulse tsync. FIG. 4 shows an example of timing charts of generating the reset pulse. In FIG. 4, it is illustrated that the capacity of the line memory is assumed to be about 2H, the input signal is written to the line memory and the read time difference is about 1H on an average, however, when the capacity of the line memory is larger, the time difference Trp is also increased. At the reset timing, as mentioned above, the skew is generated and therefore, there is seen a disturbance of image caused by the skew on a TV screen when the reset is carried out within an effective image period. The problem is resolved by resetting the phase of the pulse tsync outside of the effective image period. As a specific reset position, it is preferable to set the reset position at a position preceding a front edge t2 of the vertical synchronizing signal portion of the output signal in FIG. 4 by a time period of Td2 (which is equal to or larger than 3H and is equal to or smaller than 10H) (a time range between t3 and t4 of the drawing). At a timing earlier than t3, there is a concern that the skew portion is seen at a lower portion of a screen on a television monitor and at a timing later than t4, there is a concern of causing the skew in a time period of inserting the equalization pulse of the vertical synchronizing signal portion and bringing about a hazard in vertical flyback operation of television.

Figure 5:
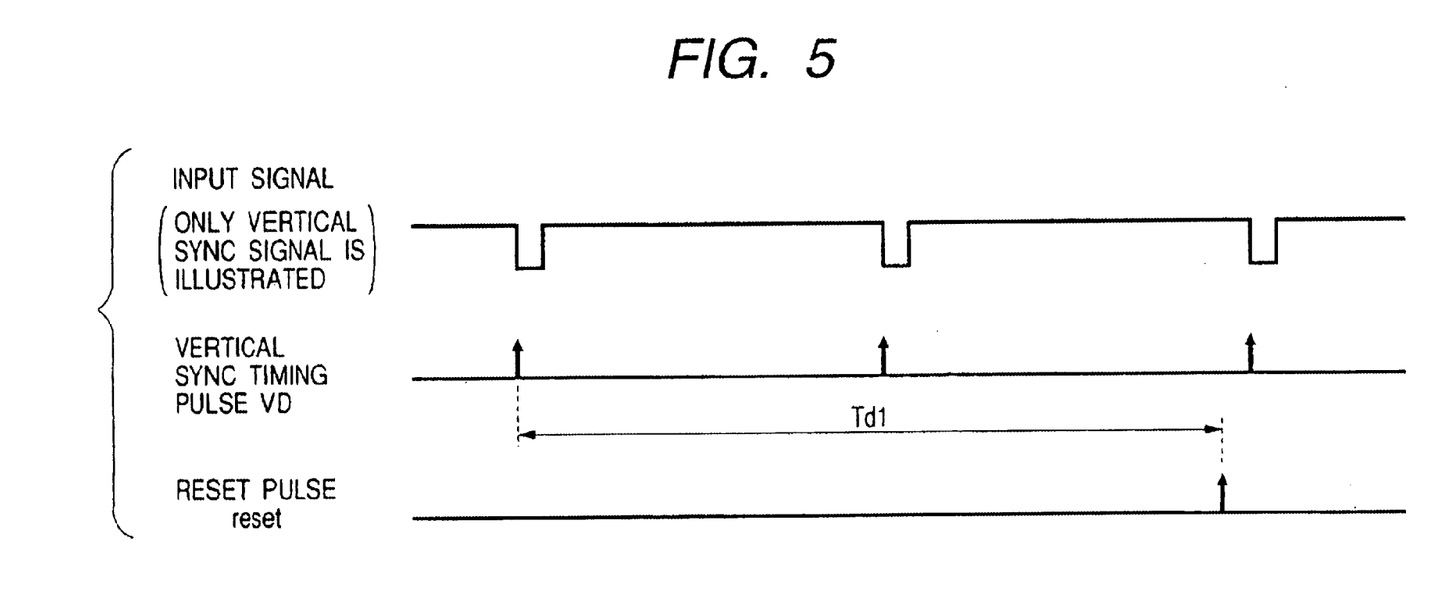
FIG. 5 is a diagram showing an example of a method of generating the reset pulse in FIG. 1.

Next, an explanation will be given of a method of generating the reset pulse of reset. FIG. 5 shows an example of a method of generating reset. Based on the pulse csync outputted from the synchronizing signal separator 4, a position of a vertical synchronizing signal is detected at inside of the pulse generator 5 and a pulse VD having a timing substantially coinciding with a front edge of the vertical synchronizing signal is generated. The reset is generated at the reset timing while being delayed from the above-described timing by a time period of Td1. As the delay time period Td1, the time period set to smaller than 1 field is the shortest, which is preferable setting in accelerating response of TBC.

Figure 6A:
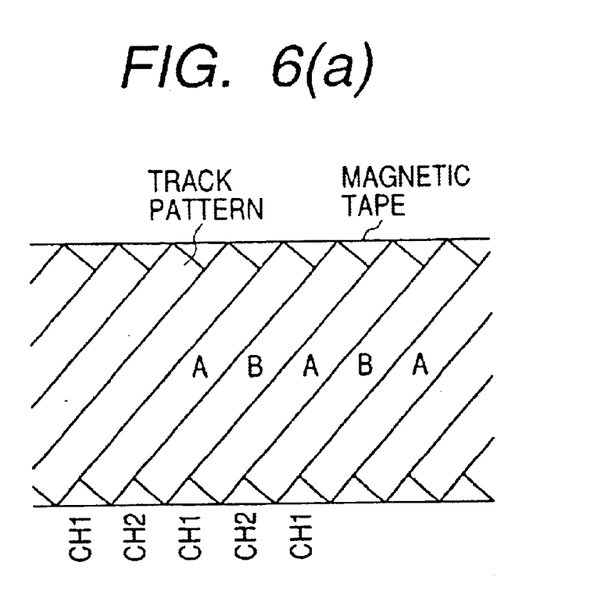
FIGS. 6a and 6b are views showing a correspondence between a track pattern and a head constitution in the helical scan VTR.
Figure 6B:
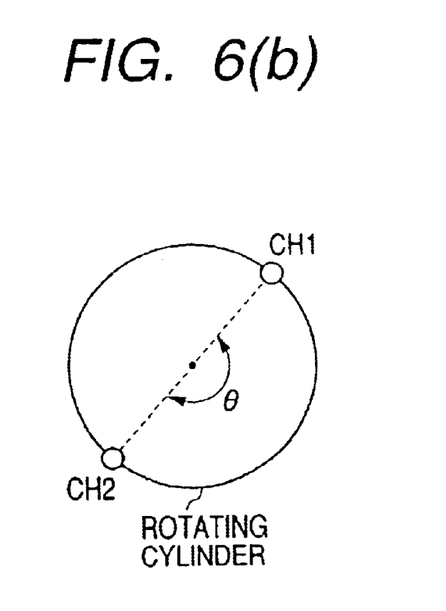

However, in the case in which a reproduced signal of VTR for household use (helical scan system of opposed head) is inputted as the input signal from the terminal 1, there poses a problem shown below when Td1 is smaller than 1 field. As shown by views of an example of a track pattern and a head constitution of the helical scan system in FIGS. 6(a) and 6(b), two opposed heads trace tracks on a magnetic tape alternately such that track A is traced by CH1 head and track B is traced by CH2 head to thereby read record data and therefore, when attention is paid to one head, the data is read at every 2 fields. In this case, when the heads of CH1 and CH2 are opposed to each other completely by 180 degree, the both heads are switched at a timing at exactly every field, however, actually, the both heads are not accurately opposed to each other owing to an error in positions of attaching thereof or the like and accordingly, normally, there is more or less deviation between the field length reproduced by CH1 and the field length reproduced by CH2. In this case, it is not preferable to set Td1, mentioned above, to less than 1 field because there is constituted operation operating reset pulses to the heads different from each other and therefore, the reset position is shifted from a desired timing. Therefore, in this case, it is preferable to carry out detection of VD and generation of reset with respect to the same head by setting Td1 to less than 2 fields. An explanation will be given of an example of the delay time Td (=Td1+Td2) in this case in the case of input and output signal waveforms shown by FIG. 4. Although the front edge of the vertical synchronization waveform of the output signal is disposed at time t2 delayed from the vertical synchronization waveform of the input signal by 1H, according to the drawing, for convenience, the output signal delayed from the input signal by an amount of "m" fields ("m" is an integer) , is illustrated on the same drawing and m=2 when Td1 is less than 2 fields. Therefore, the value of Td in this case becomes 2 field+1H. However, as mentioned above, FIG. 4 is illustrated by assuming that the capacity of the line memory is about 2H, the input signal is written to the line memory and it is illustrated that the read time difference Trp ($^3$ 0) is about 1H on an average and Td=2 field+Trp at this occasion constitutes the above-described value, however, this is only an example and by changing the capacity of the memory, the above-described time difference Trp is changed. Strictly speaking, there is no upper limit in Trp, however, in the case in which the capacity exceeding 2 fields is used, it is rather preferable to restrain the memory capacity to be small by setting Td1 to less than 4 fields and therefore, in reality, Trp<2 fields is pertinent. Therefore, Td of 2 fields <Td <4 fields is pertinent. Incidentally, when Td1 is set to be less than 3 fields, similar to the case of setting Td1 to less than 1 field, mentioned above, such Td1 is not pertinent since there is constituted operation of operating reset pulse to heads different from each other.

Figure 3:
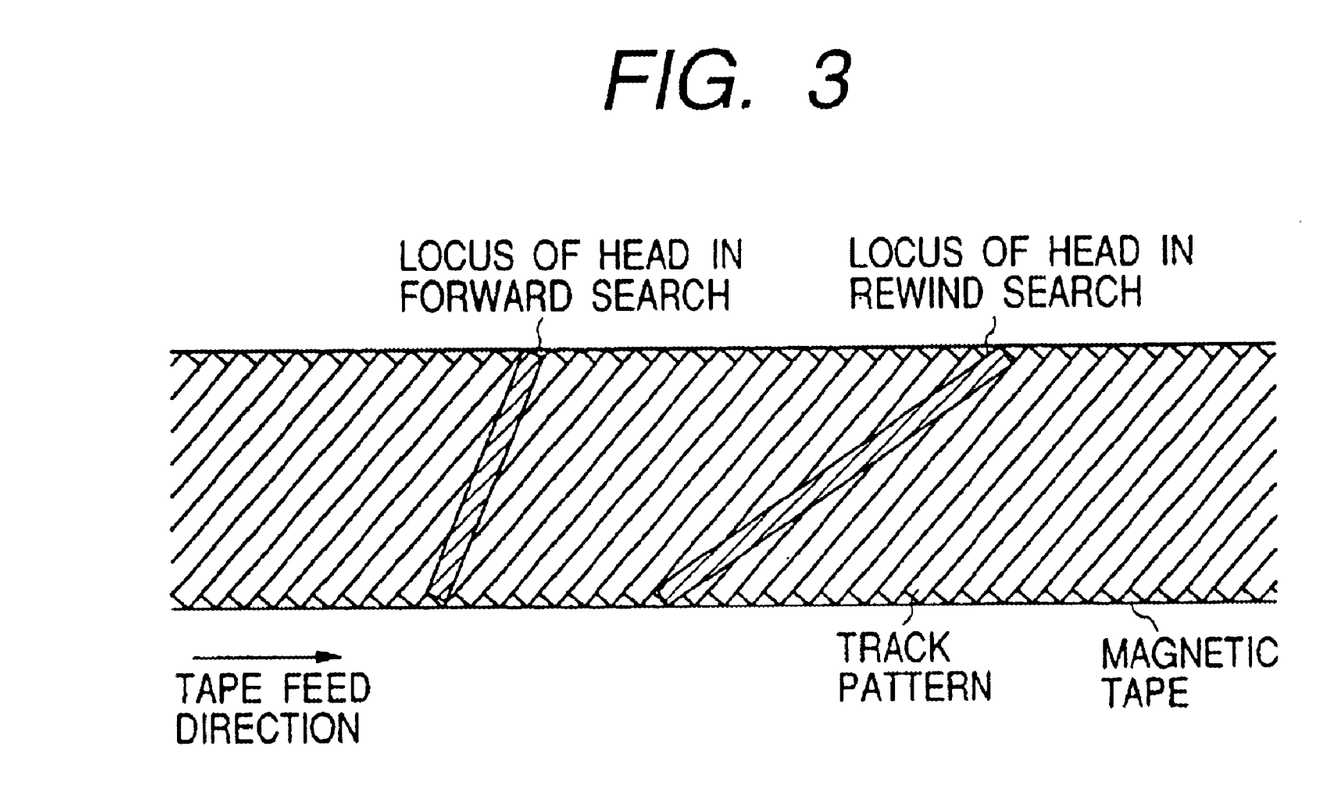
FIG. 3 is a view showing an example of a head locus in special reproducing operation in a helical scan VTR.

In the meantime, when a special reproduced signal of VTR for household use is inputted from the terminal 1, head loci as shown by an example in FIG. 3 are tracked and accordingly, the period of 1 field is provided with a value different from that of the standard signal. Specifically, in forward search, the field period is shortened and in rewind search, the field period is prolonged. According to a first generating method of generating the reset pulse by delaying the reset pulse from VD by Td1, unless the period of Td1 is increased or reduced in conformity therewith, the timing of the reset pulse is shifted. In order to resolve the problem, in FIG. 1, a number of lines in the field of the pulse csync is counted by the field length detector and field length information fld is generated and transmitted to the pulse generator 5. In the pulse generator 5, the amount of Td1 is made variable based on the field length information fld. Thereby, the field period of the synchronizing signal added to the TBC output signal is also made variable by following the field length of the input signal.

In addition thereto, the effect of switching the field length is operated while being delayed by Td1 and accordingly, in the case in which the field length of the input signal is varied by a period shorter than Td1, for example, in the case in which a normal reproduced signal of VTR for household use is inputted, there is a concern that correct following operation cannot be executed to thereby cause a trouble. Therefore, practically, in the case of the deviation in the field length to a degree of being produced in normal reproducing operation of VTR, it is preferable to operate VTR with a fixed amount of Td1 and to operate VTR, in search screen of VTR, by making the amount of Td1 variable. In VTR for household use in recent times, there are many products in which the deviation of the field length in normal reproduction screen is about ±0.2H and the deviation of the field length in search operation is equal to or larger than about 10H and therefore, it is preferable to set a threshold value Tth of the deviation of the field length in a range of from 0.5H to 8H. The above-described is resolved by operating VTR with fixed Td1 when the deviation amount is smaller than Tth and with variable Td1 when the deviation amount is larger than Tth. The resolving method is naturally applicable to both of the case in which the input signal is shorter than the field length of the standard signal and the case in which the input signal is longer than the field length of the standard signal.

Further, according to the synchronizing signal generator 9, correct image cannot be reproduced unless a synchronizing signal for odd field is added when the signal inputted from the terminal 1 is odd field and a synchronizing signal for even field is added when the signal inputted from the terminal 1 is even field. In order to resolve thereof, in FIG. 1, a discrimination of odd/even is carried out by the field discriminator 13 and a result of the discrimination is transmitted to the synchronizing signal generator 9 as an odd signal (high level in the case of odd field, low level in the case of even field) and a synchronizing signal coinciding with odd/even of the input signal is added.

In the meantime, there are many cases in which a menu screen, the screen of game or the like of VTR for household use is constructed by a structure of a non-interlace signal (odd fixed or even fixed). When the non-interlace signal is inputted from the terminal 1, synchronization of the TBC output can be dealt with by synchronization addition with odd fixed or even fixed by the above-described operation. When an output from the synchronizing signal adder 10, that is, TBC output is selected by a switch 18 of FIG. 1, there poses no problem by the operation.

However, in the case in which an output from the MPEG decoder 17 is selected, the following problem is posed. In FIG. 1, the output from the synchronizing signal adder 10 is also inputted to the MPEG2 encoder 16 and is converted so a compressed image. The compressed image is inputted to the MPEG2 decoder 17 via recording and reproducing by the storage means 19 and decoded and inputted to the switch 18. By the signal path, recording and reproducing of the compressed image is realized, the TBC block 15 is arranged at the prestage of the MPEG2 encoder which is an image compressing circuit and carries out effective operation by suppressing jitter provided to a nonstandard signal. In this case, generally, the MPEG2 encoder 16 is constituted with an algorism of an image compressing processing on the premise that the input signal is an interlace signal and when the non-interlace signal is inputted, the processing is failed and there poses a problem of freeze of output screen or generation of block noise. In order to resolve the problem, in the case in which the output signal from the MPEG2 decoder 17 is selected at the switch 18 and when the non-interlace signal is inputted from the terminal 1, the odd output from the field discriminator 13 is not fixed but the odd output is outputted such that the odd/even fields are alternately repeated at respective fields spontaneously. As a result, the TBC output signal is inputted as the interlace signal and the processing of the MPEG2 encoder can be avoided from being failed. In view of strict picture quality, an image inputted as the non-interlace signal is outputted as the interlace signal and accordingly, there is constituted an image in which a display position of one field is displayed while being shifted by an amount of 1 line and there is accompanied a deterioration in picture quality such that oblique lines are a little serrated or the like, in comparison with a significant trouble of freezing image or generating block noise, this is a far insignificant deterioration and is a practically effective resolution measure.

As a function of monitoring whether image compression/decompression is normally carried out, there is a case in which the output from the MPEG2 encoder 16 is decoded by the MPEG2 decoder 17 in real time without interposing recording and reproducing operation at the storage portion 19 (hereinafter, abbreviated as digital monitor). Also in this case, similarly, the above-described resolution measure (measure of adding interlace synchronizing signal spontaneously) is effective.

In contrast to the above-described digital monitor, on the other hand, there is present a monitor having a path which does not pass through the image compression/decompression processing (hereinafter, abbreviated as analog monitor) and in FIG. 1, a path in the case in which the output from the synchronizing signal adder 10 is selected by the switch 18 corresponds thereto. Further, as an analog monitor, a signal for inputting to the memory 6 may be selected. As an example of a method of operation in an apparatus provided with both an analog monitor and a digital monitor, in FIG. 1, there is adopted a method in which a user selects either one of the monitors by way of an operation button 21 and a monitor screen is selectively switched by controlling the switch 18 via a microcomputer 20 by the information. In this case, the microcomputer 20 is inputted with the non-interlace information int from the field discriminator 13 and the field length information fld from the field length detector 14 and when a signal in which the non-interlace signal or the field length are not standard, is inputted, it is an effective method to carry out a processing of forcibly switching to the analog monitor even when the user selects the digital monitor. By carrying out the processing, there can be realized a measure in which the picture quality deterioration in the digital monitor image is not seen by the user.

As described above, according to the embodiment, there can be constituted the system in which TBC is provided at the prestage of the image compression circuit and the input signal to the image compression circuit is processed in a mode proximate to the standard signal, further, there can be realized the video signal processing apparatus capable of dealing with also the cases of inputting the non-interlace signal or the signal the field length of which differs from that of the standard signal.

According to the present invention, there can be provided the video signal processing apparatus having the time axis correcting function of processing the input signal to the image compression circuit in the mode proximate to the standard signal and capable of preferably processing also the case of inputting the noninterlace signal or the nonstandard signal the field length of which differs from that of the standard signal.

The invention may be embodied in other specific forms without departing from the spirit or essential characteristic thereof. The present embodiment is therefore to be considered in all respects as illustrative and not restrictive, the scope of the invention being indicated by the appended claims rather than by the foregoing description and all changes which come within the meaning and range of equivalency of the claims are therefore, intended to be embraced therein.

We claim:

1. A video signal processing apparatus comprising:
   a memory to which an inputted first video signal is written;
   a compression circuit for compressing a second video signal read from said memory; and
   an expansion circuit for generating a third video signal by expanding the compressed signal, further comprising:
   a synchronizing signal separator for separating first synchronization information from said first video signal;
   writing and reading control circuits for controlling writing and reading to and from said memory;
   a changeover switch for selecting and outputting either one of said first and said second video signals or said third video signal; and
   a switch control circuit for controlling to select said changeover switch based on said first synchronization information.

2. A video signal processing apparatus according to claim 1, further comprising:
   a field discriminator for discriminating whether said first video signal is an interlace signal or a non-interlace signal from said first synchronization information;
   wherein said switch control circuit controls to switch said changeover switch based on a result of discrimination of said field discriminator.

3. A video signal processing apparatus according to claim 1 further comprising:
   a field length detector for detecting a field length Tf1 from said first synchronization information;
   wherein said switch control circuit controls to switch said changeover switch based on a value of said field length Tf1.

4. A video signal processing apparatus according to claim 3:
   wherein in the case in which an absolute value of a difference Tf (=Tf1−Tf0) between a field length Tf1 of said first synchronization information detected by said field length detector and a field length Tf0 of a standard signal, is larger than a threshold value Tth, said switch control circuit controls to select either one of said first and said second video signals.

5. A video signal processing apparatus according to claim 4:
   wherein said threshold value Tth is set in a range of $0.5H \leq Tth \leq 8H$ (notation H designates a horizontal scanning period).

6. A video signal processing apparatus for writing an inputted first video signal to a memory and reading said first video signal from said memory as a second video signal, said video signal processing apparatus comprising:
   a synchronizing signal separator for separating first synchronization information from said first video signal;
   a write control circuit for controlling writing to said memory based on said first synchronization information;
   a synchronizing signal generator for generating second synchronization information; and
   a read control circuit for controlling reading from said memory based on said second synchronization information;
   wherein said synchronizing signal generator generates said second synchronization information having a front edge of a vertical synchronization waveform at a position delayed from a front edge of a vertical synchronization waveform included in said first synchronization information by a predetermined delay time Td.

7. A video signal processing apparatus according to claim 6:
   wherein said synchronizing signal generator includes a discontinuity point of a synchronization waveform at a position delayed from the front edge of said vertical synchronization waveform included in said first synchronization information by a delay time Td1 and generates said second synchronization information having the front edge of said vertical synchronization waveform at a position delayed from the discontinuity point by a predetermined delay time Td2.

8. A video signal processing apparatus according to claim 7:
   wherein said delay time Td2 is set as $3H \leq Td2 \leq 10H$ (notation H designates a horizontal scanning period).

9. A video signal processing apparatus according to claim 6:
   wherein said delay time Td is set as $2Tf1 \leq Td < 4Tf1$ (notation Tf1 designates a field length of said first synchronization information).

10. A video signal processing apparatus according to claim 7, further comprising:
    a reset circuit for generating a reset pulse at respective one field while being delayed from the vertical synchronization timing information included in said first synchronization information by said delay time Td1;
    wherein the discontinuity point of said synchronization waveform is generated by resetting a phase of said second synchronization information by said reset pulse.

11. A video signal processing apparatus according to claim 6, further comprising:
    a field discriminator for discriminating whether said first video signal is an interlace signal or a noninterlace signal from said first synchronization information;
    wherein said synchronizing signal generator selects to generate odd synchronization information or even synchronization information as said second synchronization information based on a result of discrimination of the field discriminator.

12. A video signal processing apparatus according to claim 11:
    wherein when said field discriminator determines said first video signal as the interlace signal, said synchronizing signal generator alternately generates said odd synchronization information and said even synchronization information in coincidence with odd/even of said first synchronization information.

13. A video signal processing apparatus according to claim 11:
    wherein when said field discriminator determines said first video signal as the noninterlace signal, said synchronizing signal generator alternately generates said odd synchronization information and said even synchronization information at respective fields.

14. A video signal processing apparatus according to claim 7, further comprising:
- a field length detector for detecting a field length Tf1 of said first synchronization information;
- wherein said synchronizing signal generator generates said second synchronization information by correcting said delay time Td1 based on a value of said field length Tf1.

15. A video signal processing apparatus according to claim 14:
- wherein there is calculated an absolute value of a difference Tf (Tf1−Tf0) between said field length Tf1 of said first synchronization information detected by said field length detector and a field length Tf0 of a standard signal; and
- wherein when the absolute value of the difference Tf is larger than a threshold value Tth, said delay time is made variable and when the absolute value of the difference Tf is smaller than the threshold value Tth, said delay time is fixed.

16. A video signal processing apparatus according to claim 15:
- wherein said threshold value Tth is set to a range of $0.5H \leq Tth \leq 8H$ (notation H designates a horizontal scanning period).

17. A video signal processing apparatus according to claim 1, further comprising:
- a storage portion for storing a signal compressed by said compression circuit.

* * * * *